US009217421B1

(12) United States Patent
Ahmed

(10) Patent No.: US 9,217,421 B1
(45) Date of Patent: Dec. 22, 2015

(54) MODIFIED DRAG BASED WIND TURBINE DESIGN WITH SAILS

(71) Applicant: Hassan Zohair Hassan Ahmed, Riyadh (SA)

(72) Inventor: Hassan Zohair Hassan Ahmed, Riyadh (SA)

(73) Assignee: Alfaisal University, Riyadh (SA)

( * ) Notice: Subject to any disclaimer, the term of this patent is extended or adjusted under 35 U.S.C. 154(b) by 0 days.

(21) Appl. No.: 14/622,953

(22) Filed: Feb. 16, 2015

Related U.S. Application Data

(63) Continuation of application No. PCT/IB2014/064036, filed on Aug. 23, 2014.

(51) Int. Cl.
*F03D 3/06* (2006.01)
*F03D 11/04* (2006.01)
*F03D 1/04* (2006.01)

(52) U.S. Cl.
CPC . *F03D 11/04* (2013.01); *F03D 1/04* (2013.01)

(58) Field of Classification Search
CPC ........... F03D 11/04; F03D 1/04; F03D 3/005; F03D 3/02; F03D 3/067; F03D 3/068
USPC .................................................. 415/4.2, 4.4
See application file for complete search history.

(56) References Cited

U.S. PATENT DOCUMENTS

| | | | | | |
|---|---|---|---|---|---|
| 3,995,170 | A | * | 11/1976 | Graybill | 290/55 |
| 4,191,507 | A | * | 3/1980 | DeBerg | 416/117 |
| 4,218,183 | A | * | 8/1980 | Dall-Winther | 416/41 |
| 4,392,780 | A | * | 7/1983 | Taft | 416/17 |
| 4,566,853 | A | * | 1/1986 | Likitanupak | 416/117 |
| 5,051,059 | A | * | 9/1991 | Rademacher | 415/7 |
| 5,570,997 | A | * | 11/1996 | Pratt | 416/117 |
| 2003/0143072 | A1 | * | 7/2003 | Smith, II | 416/1 |
| 2006/0171811 | A1 | * | 8/2006 | Hallac | 416/132 B |
| 2009/0196749 | A1 | * | 8/2009 | Prentice | 416/140 |
| 2012/0189446 | A1 | * | 7/2012 | Saarem | 416/13 |
| 2012/0195759 | A1 | * | 8/2012 | Feldhaus | 416/117 |
| 2012/0301297 | A1 | * | 11/2012 | Ludwick | 416/17 |

* cited by examiner

*Primary Examiner* — Edward Look
*Assistant Examiner* — Aaron R Eastman
(74) *Attorney, Agent, or Firm* — Geeta Kadambi; Riddhi IP LLC

(57) ABSTRACT

The present disclosure relates to a modified drag based wind turbine apparatus, a method of making the wind turbine and a method of using the wind turbine apparatus. The apparatus is based on a modified drag based concept whereby during a complete turn of the rotor, there will be an augmentation of a positive torque and a decrease of a negative torque resulting in double effect enhancement. The disclosed wind turbine can capture more wind kinetic energy than that energy captured by the traditional drag based wind turbines. The wind turbine apparatus comprises of a turbine supporting frame, a turbine rotor, a sail supporting arm, a sail rotational axis along with sail swinging rods, and extendable and/or shrinkable turbine sails. A simple design and construction is made for cost-effectiveness, and has small as well as large scale scalability.

17 Claims, 18 Drawing Sheets

MODIFIED DRAG BASED WIND TURBINE DESIGN WITH SAILS

CROSS REFERENCE TO RELATED APPLICATION

This application is a continuation application of and claims priority to PCT Application No. PCT/IB2014/064036 filed on 23 Aug. 2014. The pending PCT Application PCT/IB2014/064036 is hereby incorporated by reference in its entireties for all of its teachings.

FIELD OF TECHNOLOGY

The present disclosure relates to a modified drag based wind turbine apparatus with sails and its method of use.

BACKGROUND

There are various types and different sizes of wind energy converters which can be found in operation in several regions of the world. Wind energy converters can be classified according to the relative position of the axis of rotation of the wind rotor with respect to the wind direction into two main categories: horizontal axis wind turbines (HAWT) and vertical axis wind turbines (VAWT) (Erich H, 2006; David S, 2009). Most commercial wind turbines today belong to the horizontal-axis type, in which the rotating axis of blades is parallel to the wind stream. The HAWT category includes the modern high tip speed ratios wind turbines with two and three blades. The advantages of a HAWT include high generating capacity, improved efficiency, variable pitch blade capability, and tall tower base structure to capture large amounts of wind energy. HAWTs with two or three blades are the most common (Jha A R, 2011).

In the other VAWTs category, the rotor axis is in cross direction with respect to the wind stream. VAWTs include Savonius rotor, Darrieus wind turbine, Giromill wind turbine, and others. VAWTs have been used to generate mechanical and electrical energy at a range of scales, from small-scale domestic applications through to large-scale electricity production for utilities. In recent years there has been a resurgence in vertical axis wind turbine development for both urban-scale or off-grid applications as well as off-shore as alternatives to horizontal axis wind turbines (Kjellin et al 2011; Howell et al 2010; Greenblatt et al 2012; Islam M 2008; Ferreira et al 2009; Akwa J V 2012). A significant advantage of most designs of the vertical-axis wind turbines is that they are insensitive to wind direction and can accept wind from any direction and thus no yaw control is needed (Greenblatt et al 2012). Since the wind generator, gearbox, and other main turbine components can be set up on the ground, it greatly simplifies the wind tower design and construction, and consequently reduces the turbine cost. VAWTs in principle can attain a maximum coefficients of performance, $C_{p,max}$, that are comparable to those for HAWTs and they have several potentially significant advantages over the HAWTs. However, some types of the vertical-axis wind turbines, like Darrius and Cochrane turbines, must use an external energy source to rotate the blades during initialization. Because the axis of the wind turbine is supported only on one end at the ground, its maximum practical height is thus limited. Due to the lower wind power efficiency, vertical-axis wind turbines today make up only a small percentage of wind turbines (Wei T 2010).

According to the aerodynamic function of the rotor, wind energy converters can also be classified in to two types. The rotor's aerodynamic function is characterized by the fact of whether the wind energy converter captures its power exclusively from the aerodynamic drag of the air stream acting on rotor surfaces, or whether it is able to utilize the aerodynamic lift created by the flow against suitably shaped surfaces. Accordingly, there are so-called "drag-type rotors" and "lift-type rotors" (Erich H, 2009).

The "Savonius rotor", which can be found as ventilator on railroad carriages or delivery vans, and the cup anemometer used to measure wind velocity, are well-known examples of drag-type rotors with a vertical axis of rotation (Kacprzak et al 2013; Manwell et al 2010). The Darrieus rotor which is built with two or three rotor blades, and more efficient than Savonius rotor, utilizes aerodynamic lift. Another version of the Darrieus rotor is the so called H-Darrieus rotor. Instead of curved rotor blades, straight blades connected to the rotor shaft by struts are used (Eric H, 2006). FIG. 1 displays power coefficients as functions of blade tip speed to wind speed ratio for propeller type windmills, turbines using high-speed two-bladed rotors, turbines with multi-bladed rotors, turbines with Savonius rotor configurations, and Dutch type turbines.

There are still issues with the energy being wasted during the rotation and achieving more efficiency. There is a need for a refined design to mitigate these factors and be cost efficient.

SUMMARY

The present disclosure describes a modified drag based wind turbine apparatus, a method of making the wind turbine and a method of using the wind turbine apparatus.

In one embodiment, the wind turbine is based on a modified drag based design whereby during a complete turn of the rotor, there will be an augmentation of the positive torque by increasing the area of the advancing vane and a reduction of the negative torque by decreasing the area of the returning vane, resulting in double effect enhancement.

In one embodiment the wind turbine comprises of a turbine supporting frame, a turbine rotor, a sail supporting arm and a turbine sail. In another embodiment, the wind turbine comprises of a sail swinging rod along with the sail rotation axis rod.

In one embodiment, the turbine supporting frame comprises of two frame bases such as a top frame base and a bottom frame base. In another embodiment, the top frame base and the bottom frame base are connected to each other by more than one supporting frame rod such as two supporting frame rods, three supporting frame rods, or four supporting frame rods. In yet another embodiment, the turbine supporting frame further comprises of an inward shaft at the center of the frame base and is fixed to the corresponding frame base. The inward shaft provides an axis of rotation of the turbine rotor.

In one embodiment, the turbine rotor comprises of two rotor bases such as an upper rotor base and a lower rotor base connected with each other by more than one rotor rod such as two rotor rods, three rotor rods or four rotor rods. In another embodiment, the center of each rotor base comprises of a bearing with an inner diameter equals to the inward shaft diameter. In yet another embodiment, the turbine rotor further comprises of a sail fixing washer present on the rotor rod or two sail fixing washers on the corresponding rotor rods. The sail fixing washer function by tightening the turbine sail into the washer which is free to swing around the corresponding rotor rod. The turbine rotor is set inside the turbine supporting frame co-axially such that the bearing present in each of the rotor base fits over the inward shaft present on the frame bases and becomes an assembly. The turbine rotor as described may rotate inside the fixed supporting frame and about the rotor axis of rotation.

In one embodiment, the wind turbine assembly comprises of two supporting arms such as an upper supporting arm and a lower supporting arm. In another embodiment, the supporting arms hold the sail rotational axis and further comprise of a hole of an inner diameter equals to the inward shaft diameter and are fixed to it. The hole in the upper and lower supporting arm fits into the inward shaft. The upper and lower supporting arms are holding and are fixed to the sail rotational axis. The sail rotational axis is connected through more than one rod such as a sail swinging rod I, sail swinging rod II. In most embodiments, each sail swinging rod is connected to the sail rotational axis through a bearing from the top and a bearing from the bottom. The sail rotation axis rod is present in between the sail swinging rods. For each sail in the turbine, there is a corresponding sail swinging rod.

In one embodiment, the wind turbine as disclosed comprises of a sail. In another embodiment, the wind turbine as disclosed comprises of more than one sail such as two sails, three sails or four sails. The sail is connected from one side to the corresponding sail swinging rod and other side through the sail fixing washer on the corresponding rotor rod.

In one embodiments, the angle between the sail swinging rods that carry the sails are changeable during operation. In another embodiment, the sail continuously shrinks and extends during the operation.

In one embodiment, the rotor design minimizes the negative torque and replaces the eliminated negative torque by a positive torque. In another embodiment, the negative torque is replaced by a positive one by extending the width of the advancing vane and shrinking the width of the returning vane.

In one embodiment, a process of double effect enhancement for the drag-based turbine is disclosed. In another embodiment, a process of double effect enhancement by decreasing a negative torque and increasing a positive torque is disclosed. The process as disclosed is obtained by reducing the area of the returning vane to reduce the negative torque and increasing the area of the advancing vane to increase the positive torque. The process as disclosed may be applied by shifting the axis of rotation of the turbine vanes a distance away from the rotor axis of rotation and use extendable and/or shrinkable vanes.

The wind mill apparatus and the method to use the apparatus are done to improve efficiency, and may be executed to be used for various applications including household or industrial scale wind mill construction as well as hydro-power generation. The disclosed wind turbine can be made of any suitable and regularly used material. Other features will be apparent from the accompanying drawings and from the detailed description that follows.

Other features of the present embodiments will be apparent from the accompanying drawings and from the detailed description that follows.

DETAILED DESCRIPTION

The present disclosure relates to a wind turbine apparatus based on a modified drag based design with sail. More specifically the present disclosure relates to a wind turbine apparatus whereby the modified drag based design reduces the negative torque as present in the traditional drag based wind turbines and increases the positive torque. Therefore, the design is such that a double effect enhancement is obtained. The description shows the apparatus and method of using the apparatus.

Theoretically, the efficiency (or power coefficient $C_p$) any drag translator moving with velocity v in wind direction is determined from $$C_P = \frac{v}{U}\left[1 - \frac{v}{U}\right]^2 C_D \qquad (Eq\ 1)$$

Where U is the steady free stream wind velocity and $C_D$ is the drag coefficient of the translated device. The power coefficient for a drag-driven device is a maximum when $$v/U = 1/3. \qquad (Eq\ 2)$$

Thus, $$C_{p,max} = \frac{4}{27} C_{D,max}$$

If one consider a half tube drag-driven translator which has $C_D$=2.3, the maximum theoretical power coefficient for this element will be $C_{p,max}$=0.34.

Figure 1:
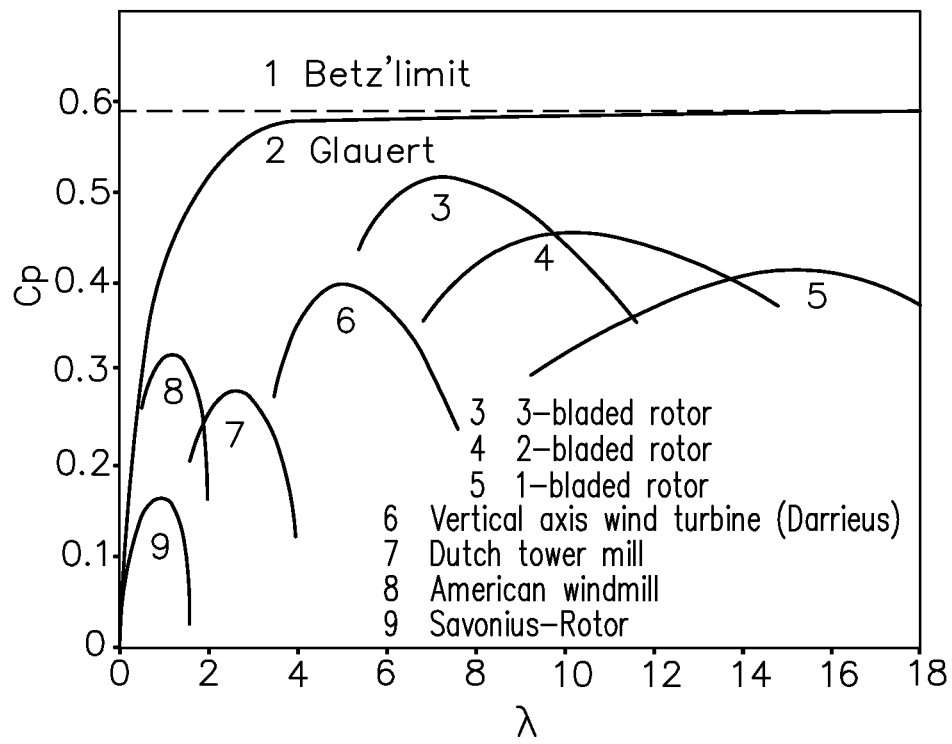
FIG. 1 shows Power coefficients as functions of blade tip speed to wind speed ratio are shown as prior art.
Figure 2:
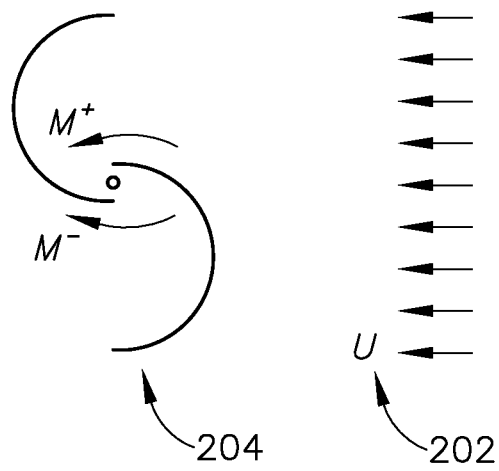
FIG. 2 shows working principle of drag-type rotors.

For any drag-type rotor, during a complete turn, there is a part of the rotor moving in wind direction (advancing part) and the other part is moving against the wind (returning part). The advancing rotor part is moving under the wind drag and generates a positive torque $M^+$ to the turbine rotor. Whereas, the other returning rotor part moves against the wind drag and generates a negative torque $M^-$ (204) at the rotor rotational axis, FIG. 2. The positive torque should be larger than the negative torque and the turbine rotor then moves due to the difference between this torques ($M^+$–$M^-$) under the influence of wind velocity 202.

It is noted that the maximum power coefficient of any drag rotating device is less than $(4/27)C_{D,max}$ based on the projected area of the drag element as well as the negative torque generated over the returning vane. Therefore, from the point of aerodynamic efficiency, drag-type rotor cannot compete with high-speed propeller and the Darrieus-type wind turbines (Saha et al 2006). For example, the maximum power coefficient of Savonius wind rotor ($C_p$≈0.15) is rather low when compared with that of the wind rotors with a horizontal axis ($C_p \approx 0.45$) and Darrieus-type wind rotor with a vertical axis ($C_p \approx 0.35$) (Mahmoud et al 2012, Kacprzak et al 2013, Manwell J 2010).

Drag-type rotor has a high starting torque, simple and cheap construction (Kacprzak et al 2013, Altan et al 2008). At low wind speed regions, drag-type rotors have shown a better starting ability than the lift-type rotors. The low tip speed of drag-type turbines offers less aerodynamic noise, which is an important issue for turbines included as part of inhabited structures (Roy and Saha, 2013). The urban environment is characterized by low wind speeds and high turbulence which make drag-type rotors good choice for building-integrated wind turbines and a cost-effective means of generating electricity in residential sector.

There have been many studies and numerous investigations on the performance of the drag-type turbines, especially Savonius rotor. Moreover, the use of curtains and adding end extensions and shielding to increase the efficiency has been investigated. However, this made the system structurally complex.

The available technical designs are not yet adequate to develop a reliable distributed wind energy converter for low wind speed conditions. The drag-type rotor appears to be particularly promising for such conditions, but suffers from a low efficiency.

The key idea behind improving the rotor efficiency is to reduce the negative torque, and increase the positive one. From this motivation, a new drag based wind turbine has been designed. In theory, the concept is not only based on eliminating the negative torque but also replacing this negative torque by positive torque. In this way, a double-effect enhancement of the rotor efficiency could be obtained.

Figures 3A, 3B:
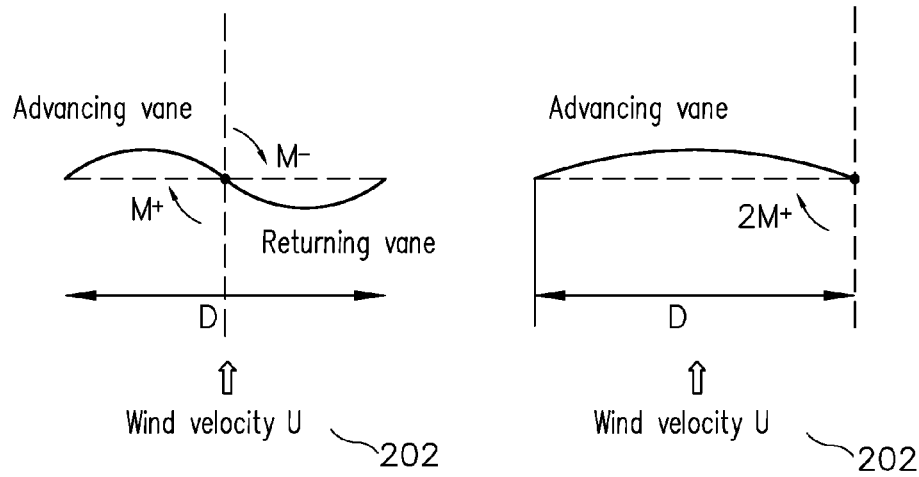
FIG. 3A shows the basic traditional drag-based rotor, and 3B the theoretical concept of double-effect for comparison.

FIG. 3 explains the difference between the basic traditional rotor and the theoretical concept of the double-effect enhancement. In the basic drag-type rotor with diameter D, FIG. 3A, the advancing vane is affected by the +ve (positive) torque $M^+$ and the returning vane is affected by the negative torque $M^-$ which must be smaller than $M^+$ to obtain a rotation of the turbine rotor. If we define the torque ratio factor $\alpha = M^+/M^-$ which is greater than 1, then the net torque on the basic rotor $M_B$ can be expressed as $$M_B = M^+ - M^- = \frac{\alpha - 1}{\alpha} M^+ \quad \text{(Eq 3)}$$

For the theoretical concept of double-effect for the same rotor diameter, FIG. 3B, the negative torque is replaced by a positive one by theoretically eliminating the returning vane and extending the width of the advancing vane to D. In this case, the net torque on the double-effect rotor $M_{D-E}$ equals to $2M^+$. Therefore, the ratio between the double-effect and the basic rotor efficiencies can be expressed by the factor J as follows $$\beta = \frac{C_{p,D-E}}{C_{p,E}} = \frac{M_{D-E}}{M_B} = \frac{2\alpha}{\alpha - 1} \quad \text{(Eq 4)}$$

Figure 4:
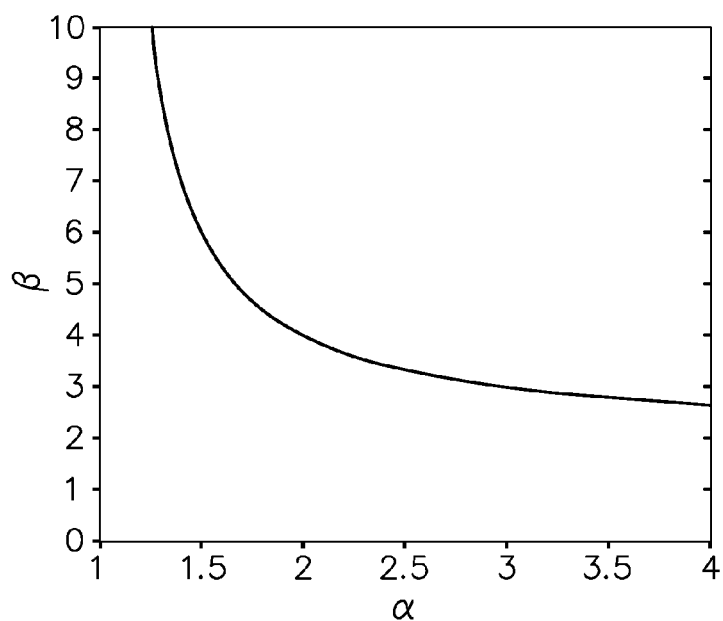
FIG. 4 shows variation of β as a function of α.

The plot of Eq. 4 is shown in FIG. 4. From the plot it can be noticed that $\beta$ is always greater than 2. The factor $\alpha$ can be approximately equal to the ratio between the drag coefficients for the advancing vane $C_{D,adv}$ to that for the returning vane $C_{D,ret}$. For a half-tube vane, $C_{D,adv} \approx 2.3$ and $C_{D,ret} \approx 1.2$. Then, $\alpha = C_{D,adv} \approx 2.3/1.2 \approx 2$ and the corresponding value of $\beta$ will be 4. This means 4 times enhancement in the rotor efficiency could be theoretically obtained through the concept of double-effect.

Figure 5:
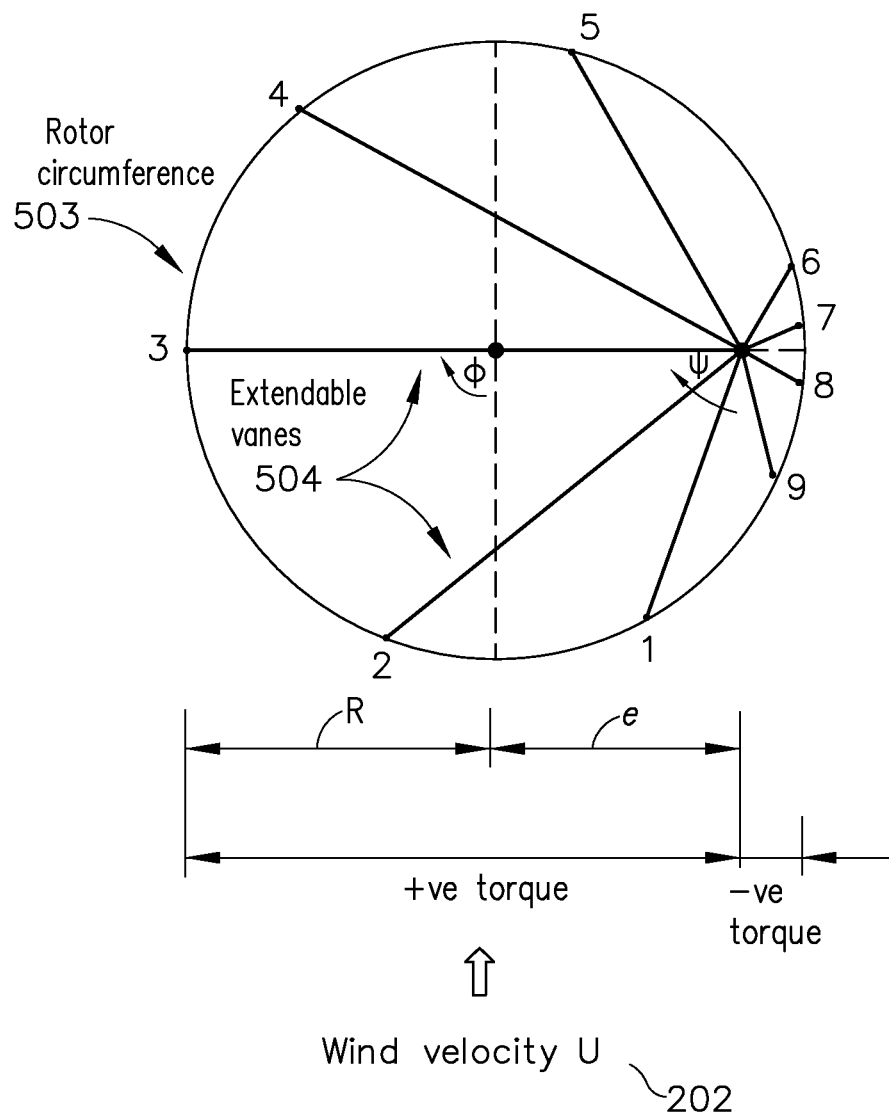
FIG. 5 shows the practical technique for the concept of double-effect.

Practically, it is impossible to totally eliminate the returning vane. However, a practical version of the theoretical double effect concept can be approached by increasing the area of the advancing vane and decreasing the area of the returning vane as much as possible. This is done by using the technique described by FIG. 5. For a turbine with radius R, there are two axis of rotation. The first is $\phi$ which is the rotation axis of the rotor and is located at the rotor center. The second is $\psi$ which is the axis of rotation for the vanes and it is shifted by a distance e from the rotor center, $0 < e < R$ (503). The turbine vanes are extendable (504) in width and are connected to axis $\psi$ from one end and to the rotor circumference from the other end. Different positions of the vane are shown in FIG. 5 while it completes one revolution about axis $\psi$, positions 1, 2, 3, 4, 5, 6, 7, 8, and 9. Since the vane is connected to the rotor circumference, the rotor will be driven by the vane through a complete rotation about axis $\phi$. Wind drag acting on the vanes is transferred to the rotor circumference and causes a torque at the rotor center, axis $\phi$ (there is no torque actin on axis $\psi$). While the vane rotates about its rotation axis $\psi$, it extends or shrinks to fill the distance between $\psi$ and the rotor circumference. For any vane position at the left hand side of $\psi$ (at $\phi$ side), the vane is subjected to positive torque (advancing vane). Whereas, at any vane position at the right hand side of $\psi$, the vane is subjected to negative torque (returning vane), FIG. 5. The vane width at positions of positive torque depends on the distance e and is always larger than the vane width at positions of negative torque. Therefore, as the distance e increases, more negative torque is eliminated and is replaced by an excess positive torque (double-effect). When $e=R$, which is the limiting theoretical case, the vane will be totally under effect of positive torque only. Therefore, at this situation, the turbine delivers the theoretical maximum power and at the maximum efficiency.

Design of the Wind Turbine Apparatus:

The disclosed modified drag based wind turbine comprises of components such as a turbine supporting frame, a turbine rotor, the sail supporting arms, a sail rotational axis, the sail swinging rods, and the turbine sails. In the following sections, these components will be described with drawings and the principle of working is explained as well.

Figure 6A:
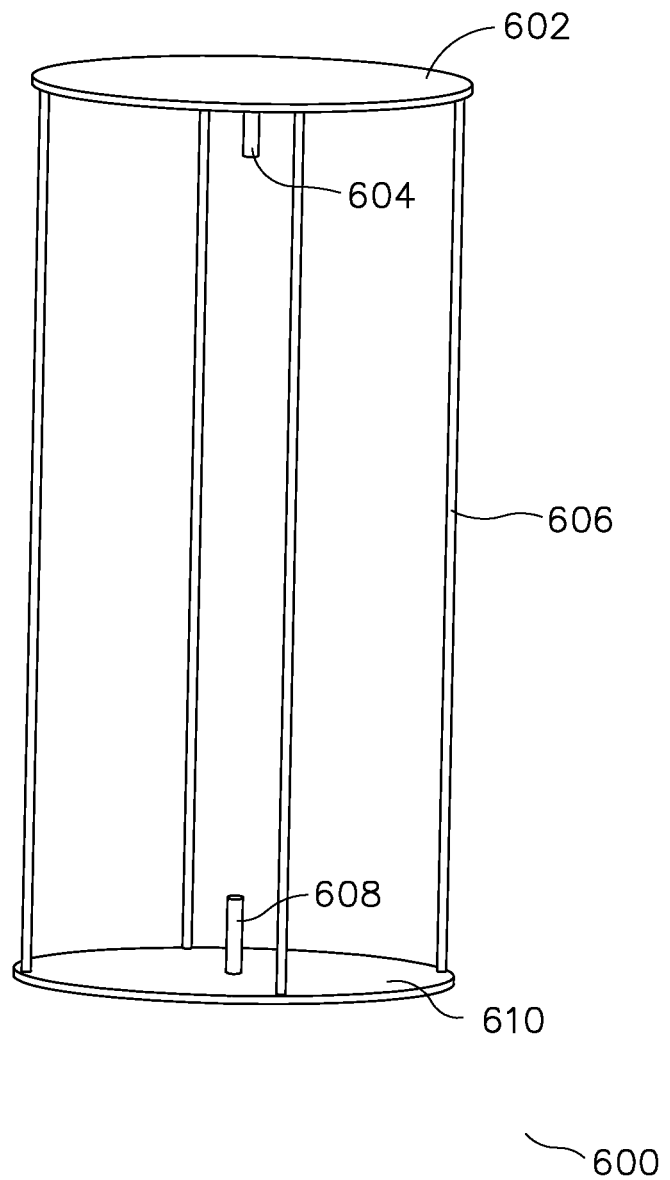
FIGS. 6A and 6B show details of the wind turbine supporting structure.
Figure 6B:
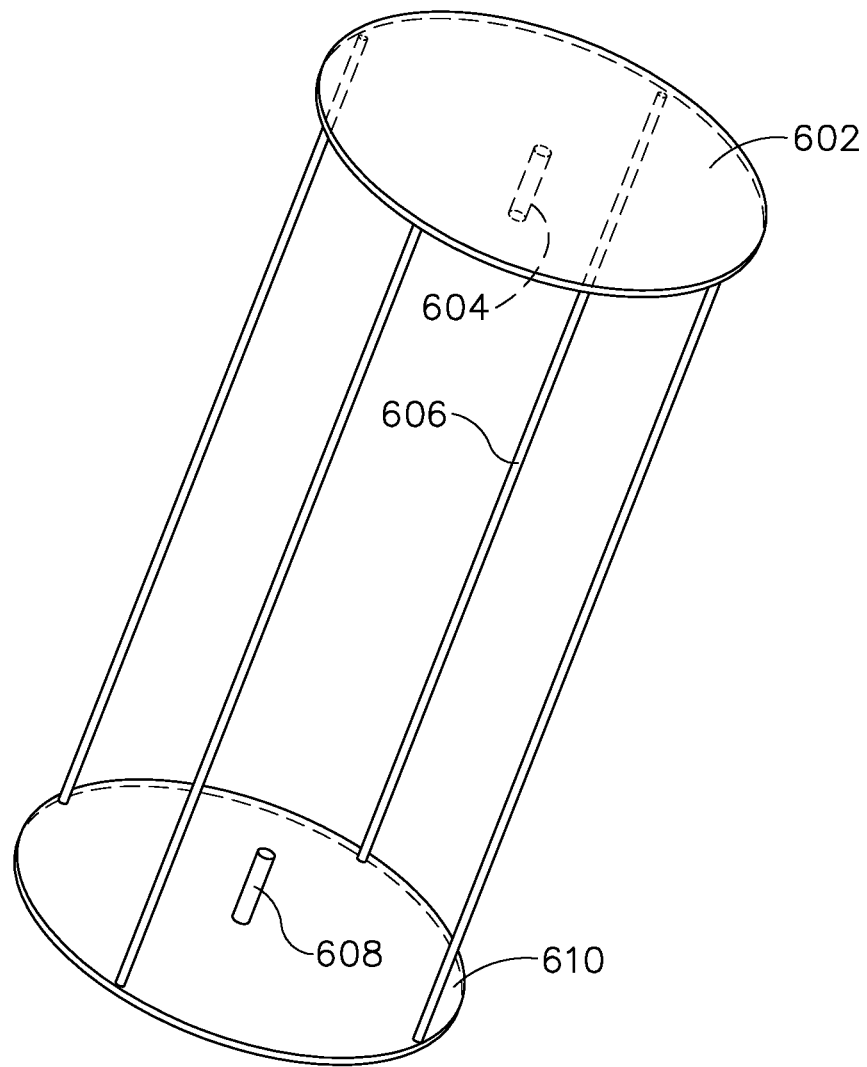

FIG. 6A shows a wind turbine supporting frame comprising of a top frame base 602 and a bottom frame base 610. The top and bottom frame bases are connected with each other by more than one supporting frame rods 606. At the center of each frame base is an inward shaft (604, 608) fixed to the corresponding frame base. FIG. 6B shows the wind turbine supporting frame from another angle showing the surface of the top frame base and the surface of bottom frame base.

Figure 7:
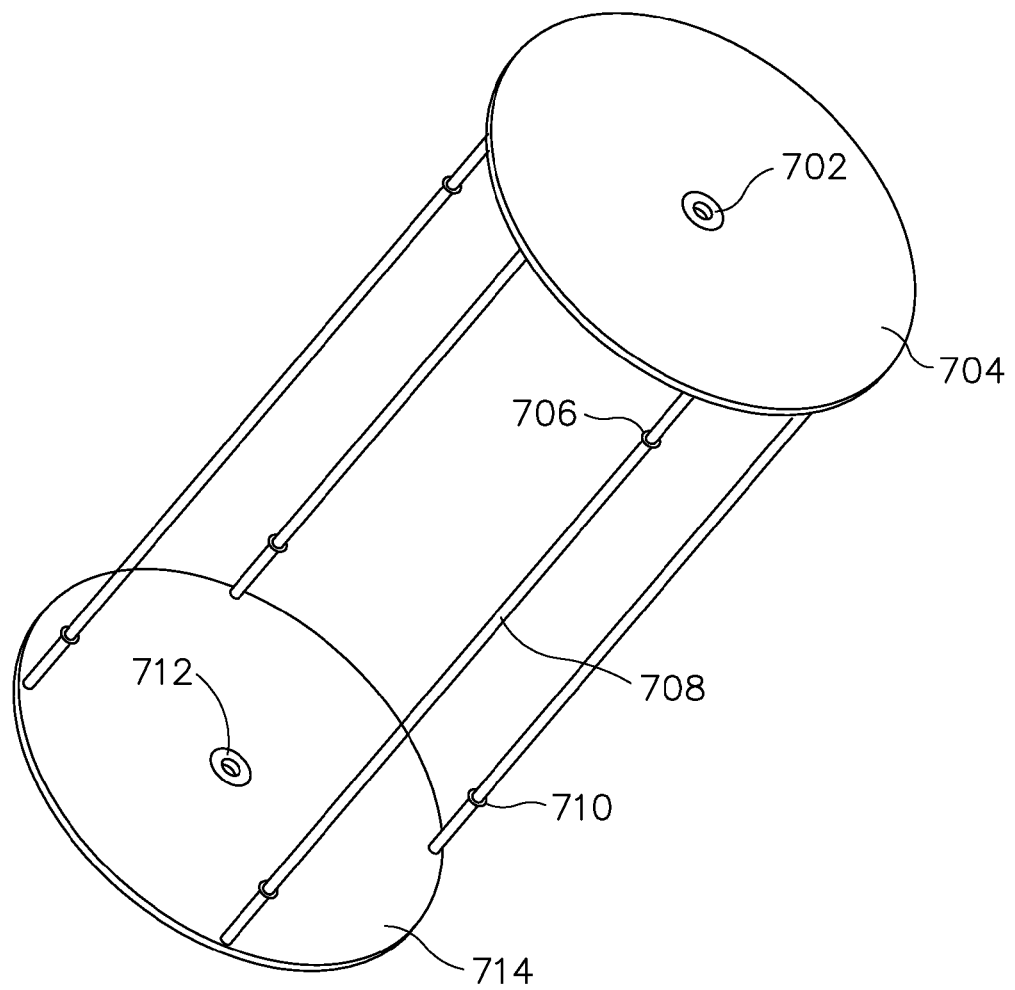
FIG. 7 shows details of the wind turbine rotor structure.

FIG. 7 shows parts of the turbine rotor. The turbine rotor comprises of an upper rotor base 704 and a lower rotor base 714 connected to each other by more than one rotor rod 708 such as two rotor rods, three rotor rods or four rotor rods. At the center of the upper and lower rotor base is a bearing 702, 712 respectively with an inner diameter that equals to the inward shaft (604, 608) diameter. Rotor rod as disclosed may also comprise of a washer (706, 710) on one or more than one rotor rod. The function of washer is to tighten the turbine sail with the corresponding rotor rod. The washer is usually present on the opposite rotor rods.

Figure 8A:
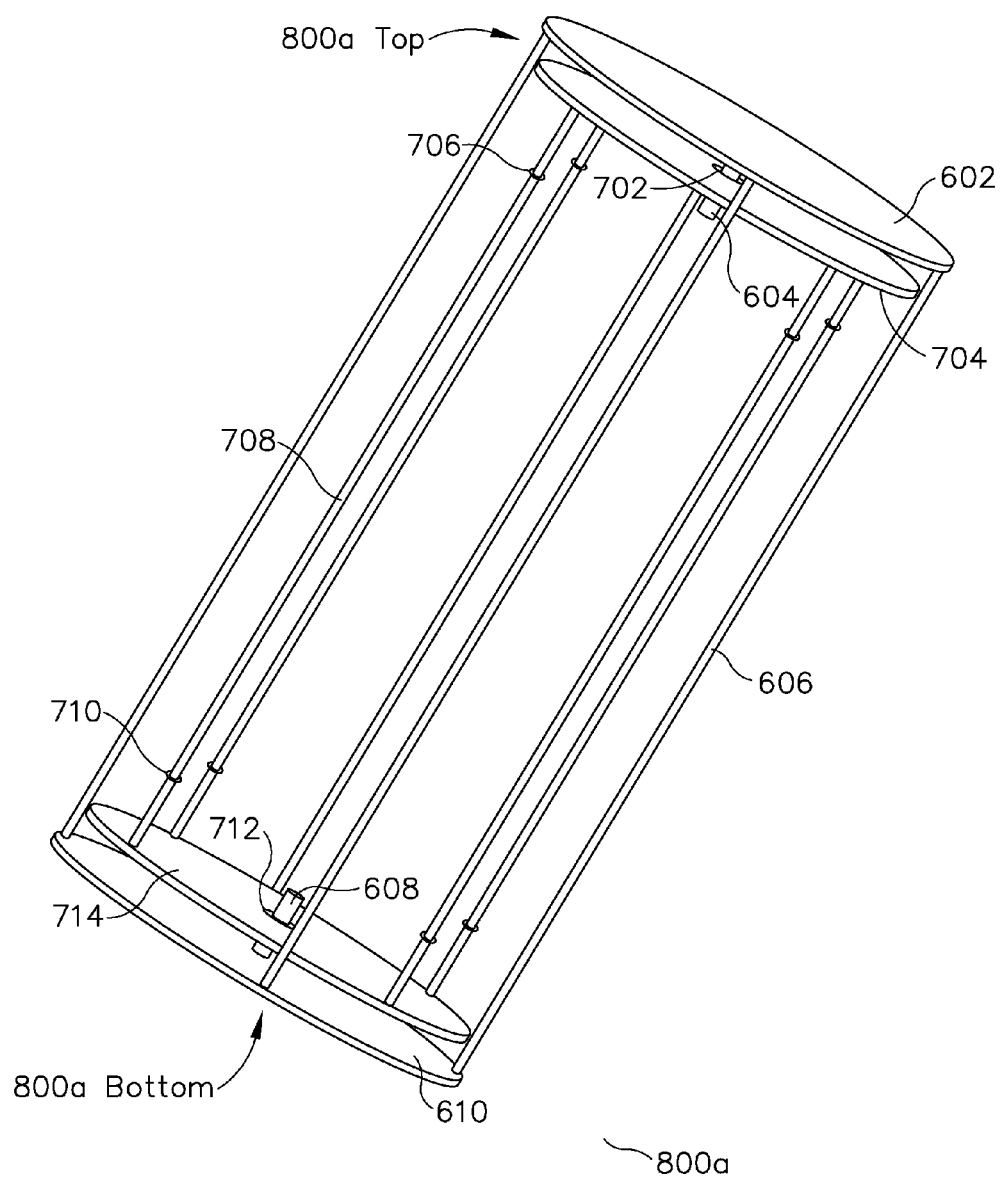
FIGS. 8A and 8B show an assembly of the turbine rotor with the turbine supporting frame.

FIG. 8A shows an assembly of the turbine rotor with the turbine supporting frame depicting the top part (800a top) and the bottom part (800a bottom) of the assembly. The turbine rotor is placed inside the turbine supporting frame co-axially.

Figure 8B:
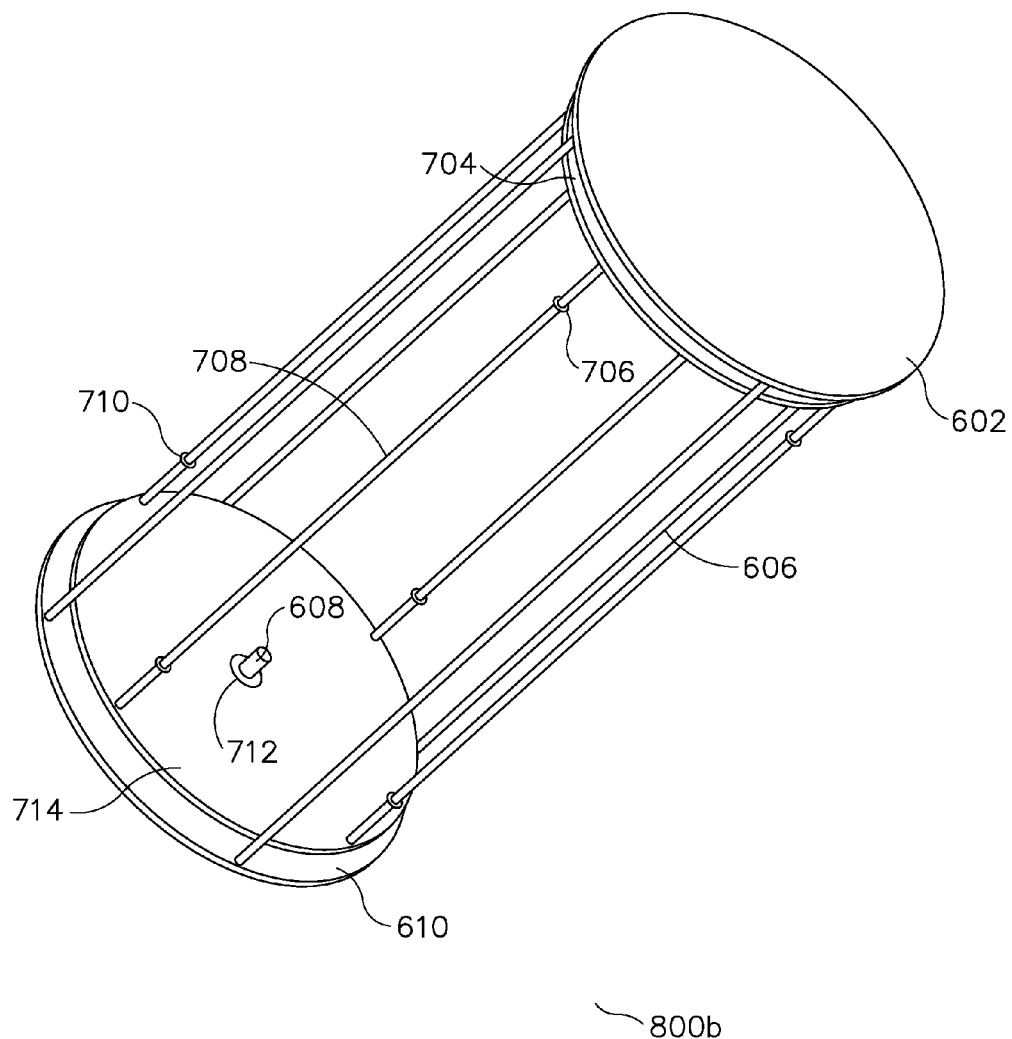

The inward shaft (604, 608) in the top frame base and bottom frame base fits into the bearing (702, 712) in the corresponding rotor base making the supporting frame and the turbine rotor as one assembly. FIG. 8B shows another view of the turbine rotor and turbine supporting frame assembly showing the inward shaft placed into the bearing of turbine rotor. The turbine rotor has an ability to rotate inside the fixed supporting frame and about the rotor axis of rotation. The assembly may be fixed together by fitting the inward shaft of the turbine supporting frame inside the bearing of the turbine rotor. Further, the diameter of the frame base will be more than the diameter of the rotor base.

Figure 9A:
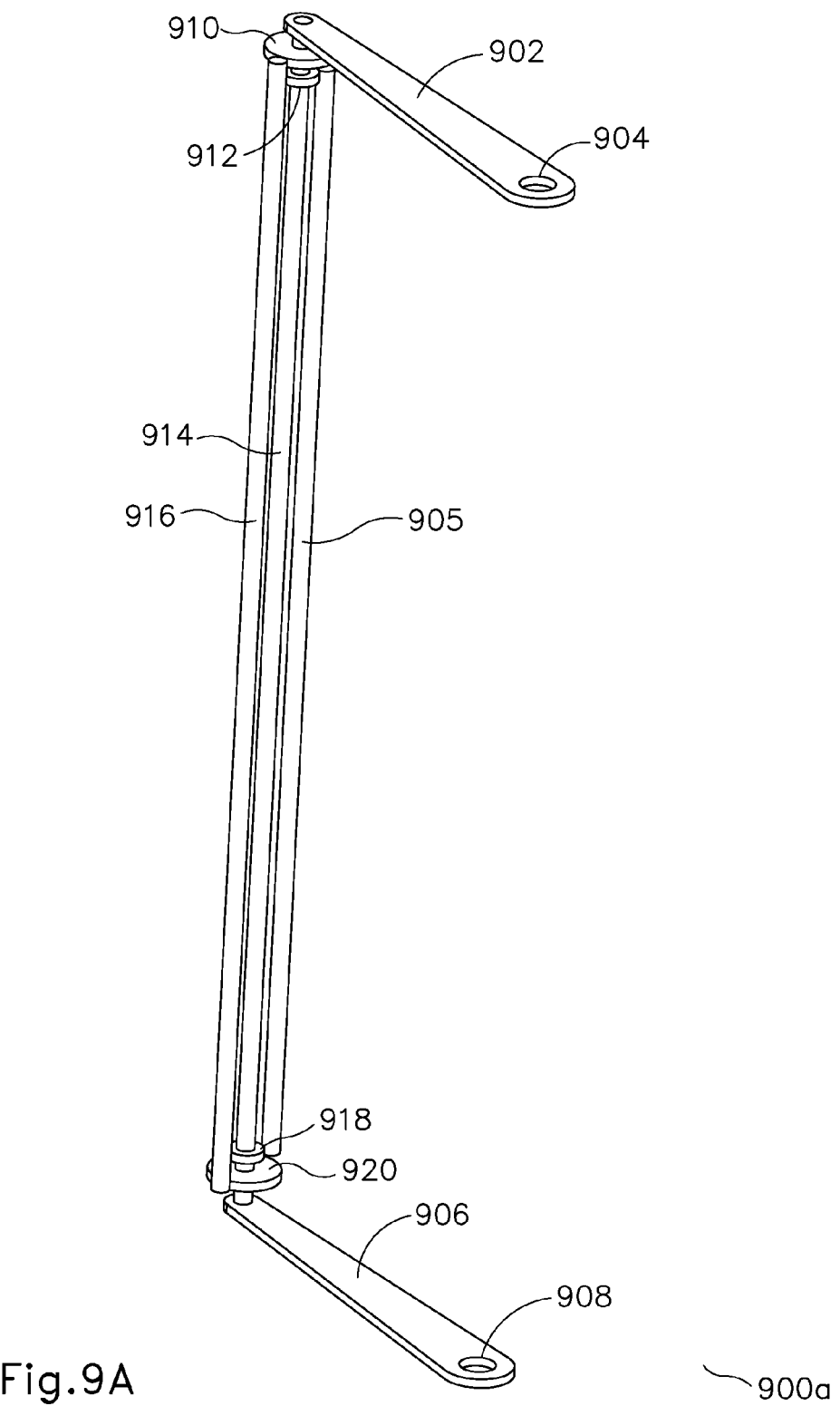
FIG. 9A-9C show details of a sail rotational axis, the sail supporting arms and the sail swinging rods.
Figure 9B:
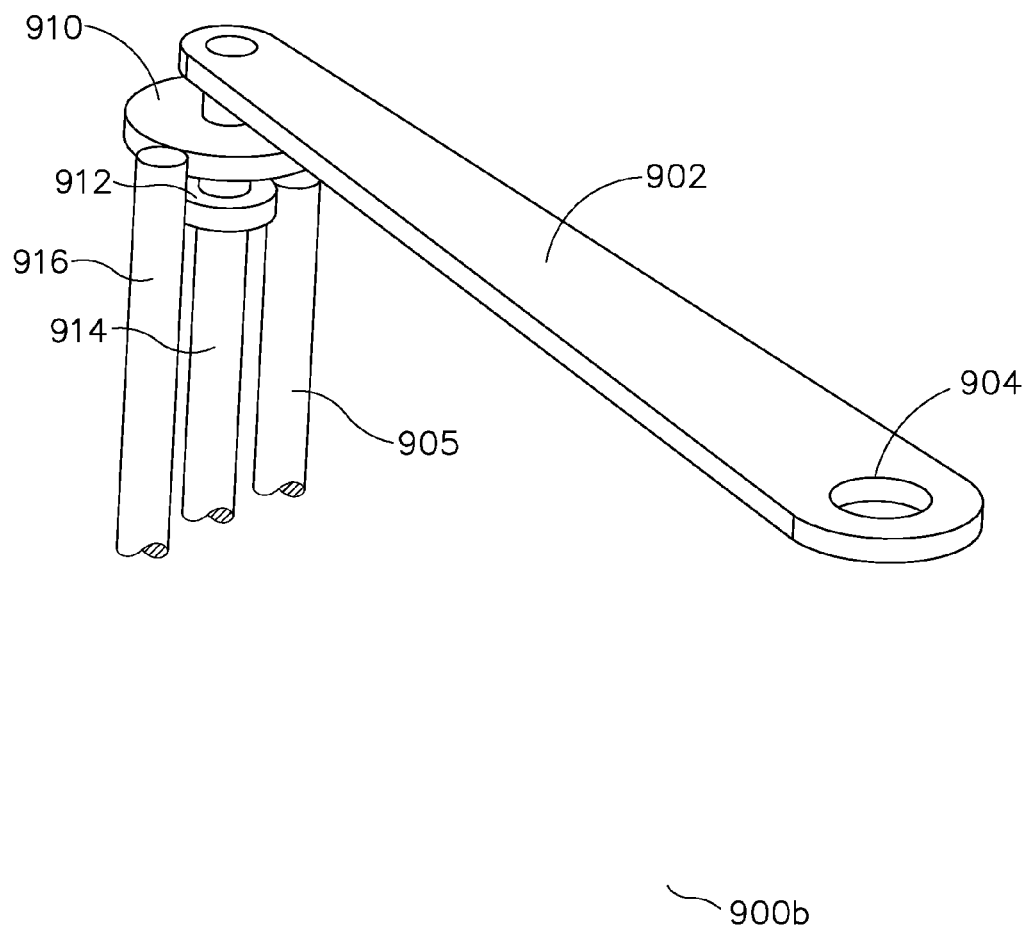
Figure 9C:
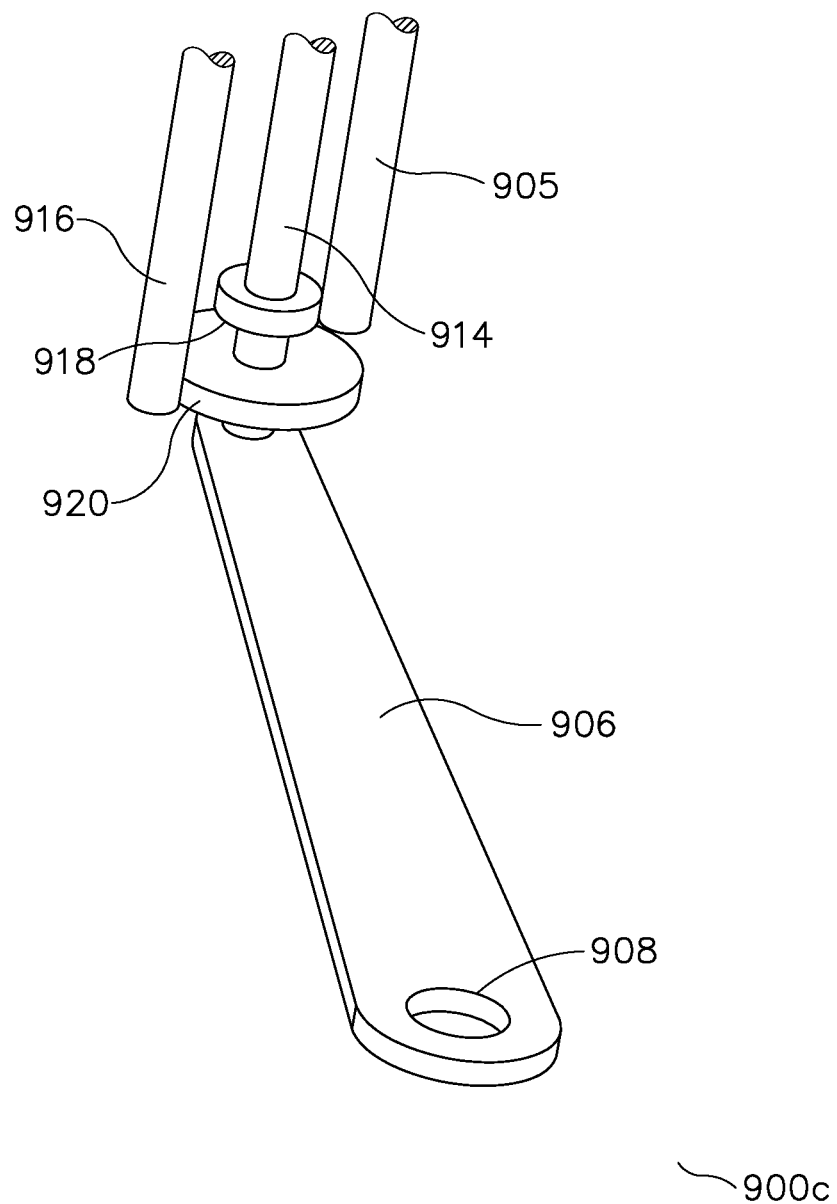

FIG. 9A shows an assembly of the sail supporting arm, the sail rotational axis, and the sail swinging rods 900a. The sail supporting arm comprises of an upper supporting arm 902 and a lower supporting arm 906. The upper and lower supporting arm further comprise of a hole (904, 908) at the end of the length of the supporting arm. The hole has an inner diameter that equals to the inward shaft diameter. The sail supporting arms hold the sail rotation axis rod 914 which is connected by more than one sail swinging rod such as a sail swinging rod I 905 and a sail swinging rod II 916. Further, there is more than one bearing fixed in the sail rotation axis. One pair of bearing (910, 920) is attached to the sail swinging rod II and pair of bearing (912, 918) is attached to the sail swinging rod I. Both the sail swinging rods are free to swing around the sail rotation axis rod 914. FIG. 9B shows enhanced details of the assembly (900b) of upper supporting arm 902 connected to the sail rotational axis rod 914 along with the sail swinging rods I 905 and II 916. Further FIG. 9B also shows bearing (910, 912) fixed to the sail swinging arms I and II. FIG. 9C shows enhanced details of the assembly (900c) of lower supporting arm 906 connected to the sail rotational axis rod 914 along with the sail swinging rods I 905 and II 916. Further FIG. 9B also shows bearing (920, 918) fixed to the sail swinging arms I and II.

Figure 10A:
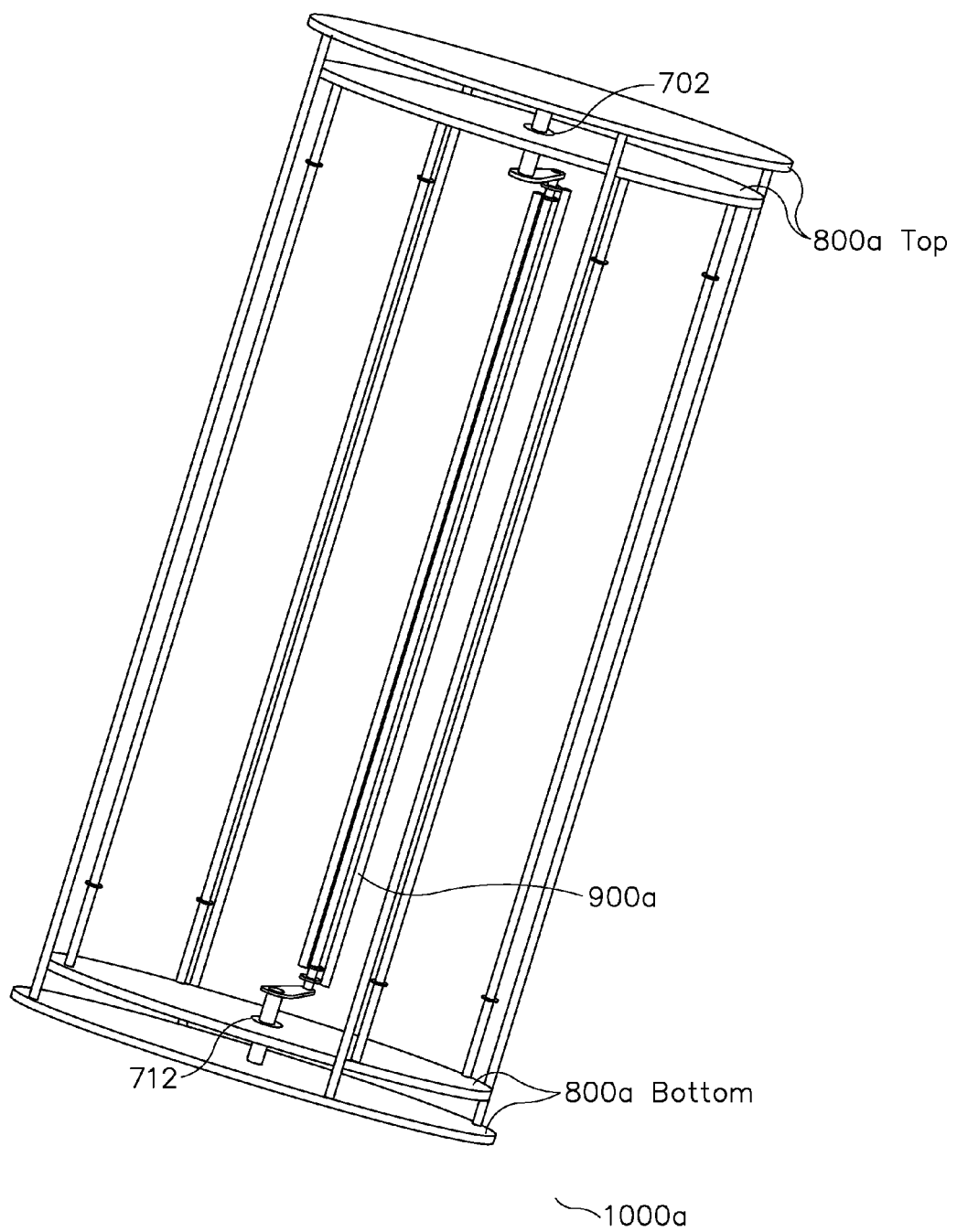
FIG. 10A-10D show assembly of the turbine supporting frame, the turbine rotor, the sail supporting arms, the sail rotational axis, and the sail swinging rods.
Figure 10B:
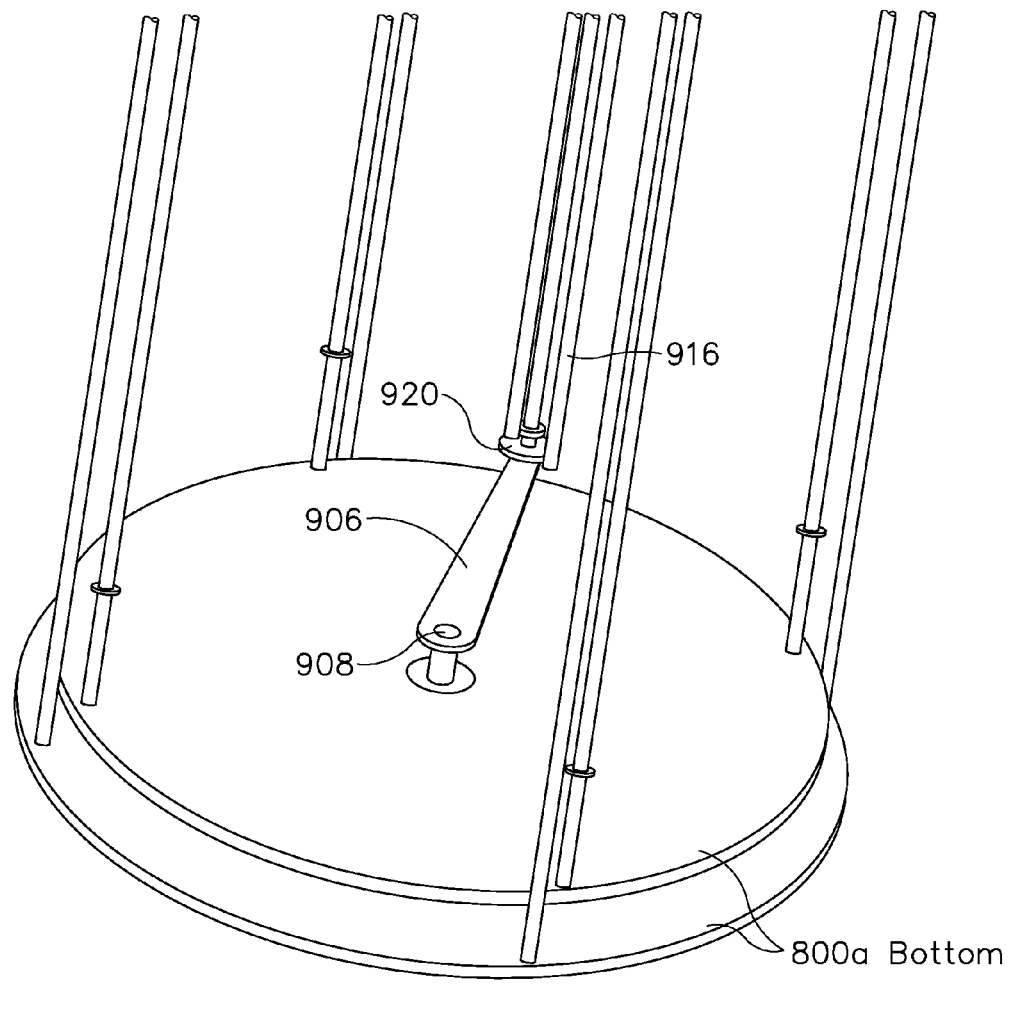
Figure 10C:
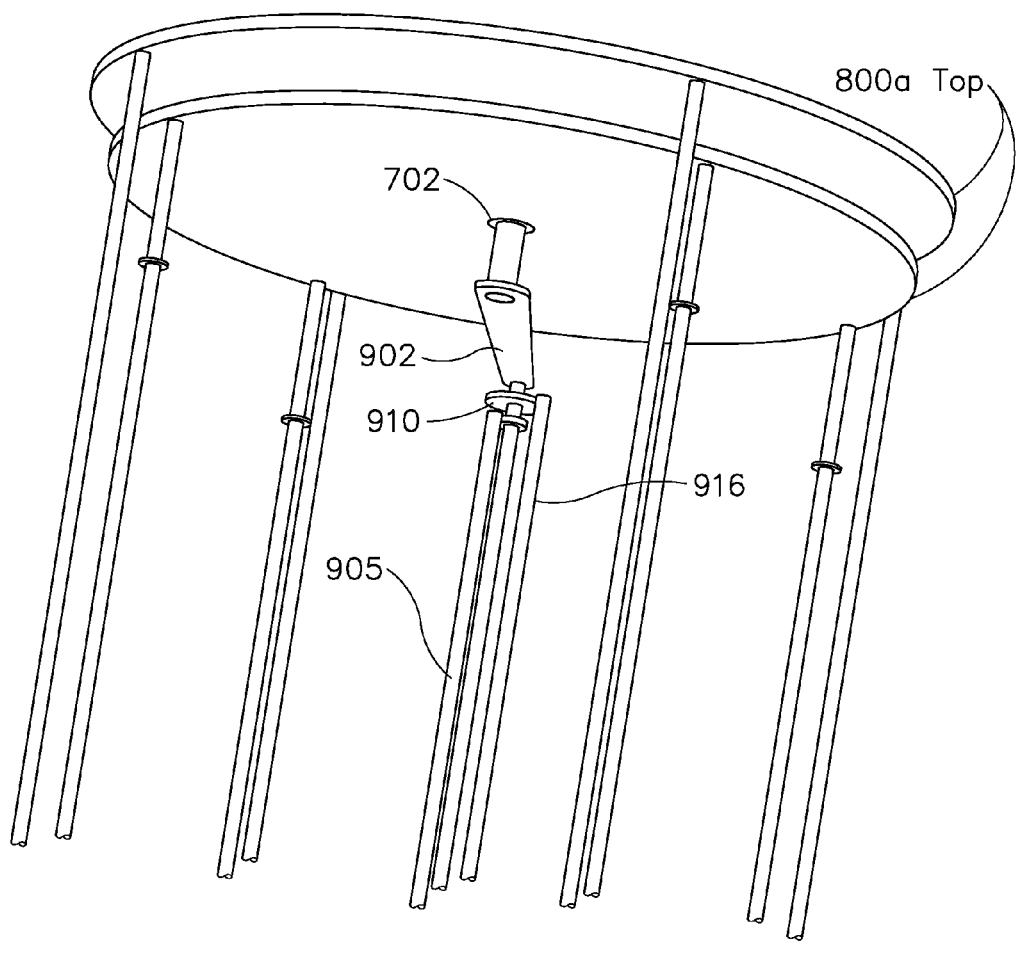
Figure 10D:
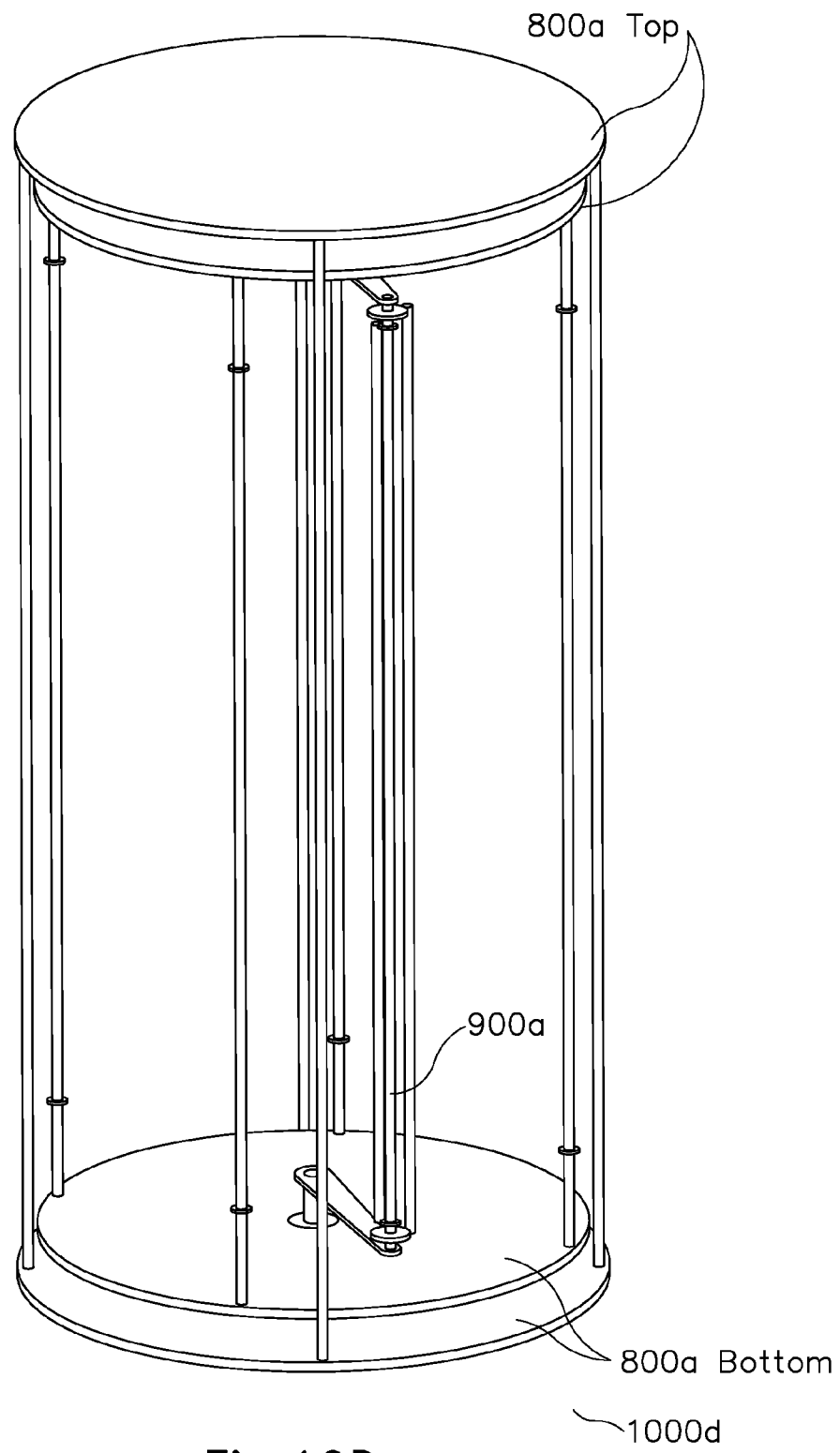

FIG. 10A shows a side view of an assembly arrangement of the turbine supporting frame, the turbine rotor and the sail supporting arm (1000a). As can be seen in FIG. 10B, the hole 908 in lower supporting arm 906 fits over the inward shaft 608 and over the bottom supporting base-lower rotor base assembly (800a bottom) 1000b. Similarly, FIG. 10C shows the hole 904 in upper supporting arm 902 fits over the inward shaft 604 and over the top supporting base-upper rotor base assembly (800a top) 1000c. FIG. 10D shows the full length assembly arrangement of the turbine supporting frame, the turbine rotor, the sail supporting arm structure, the sail axis of rotation, and the sail swinging rods (1000d). Thus, the turbine supporting frame, the turbine rotor and the sail supporting structure become as a single unit.

Figure 11A:
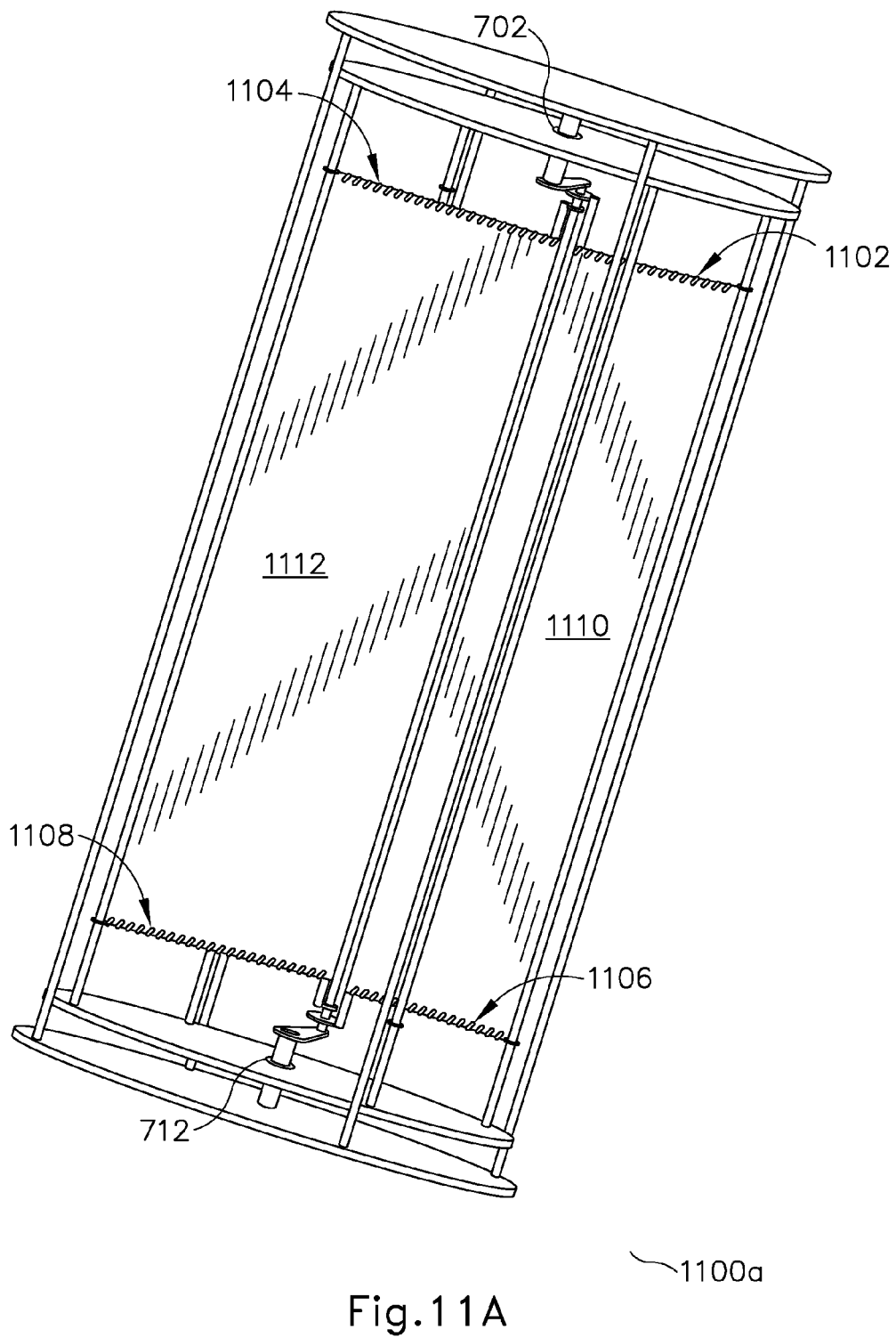
FIG. 11A-11C shows a wind turbine assembly with the sails.
Figure 11B:
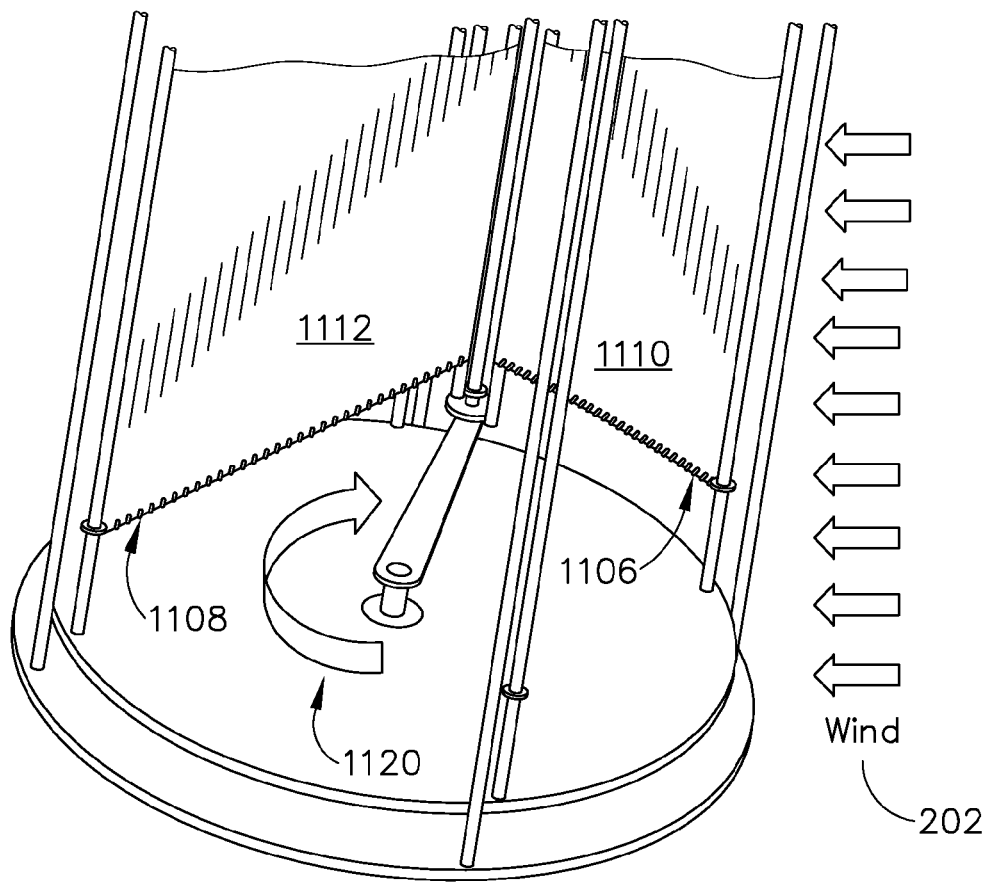
Figure 11C:
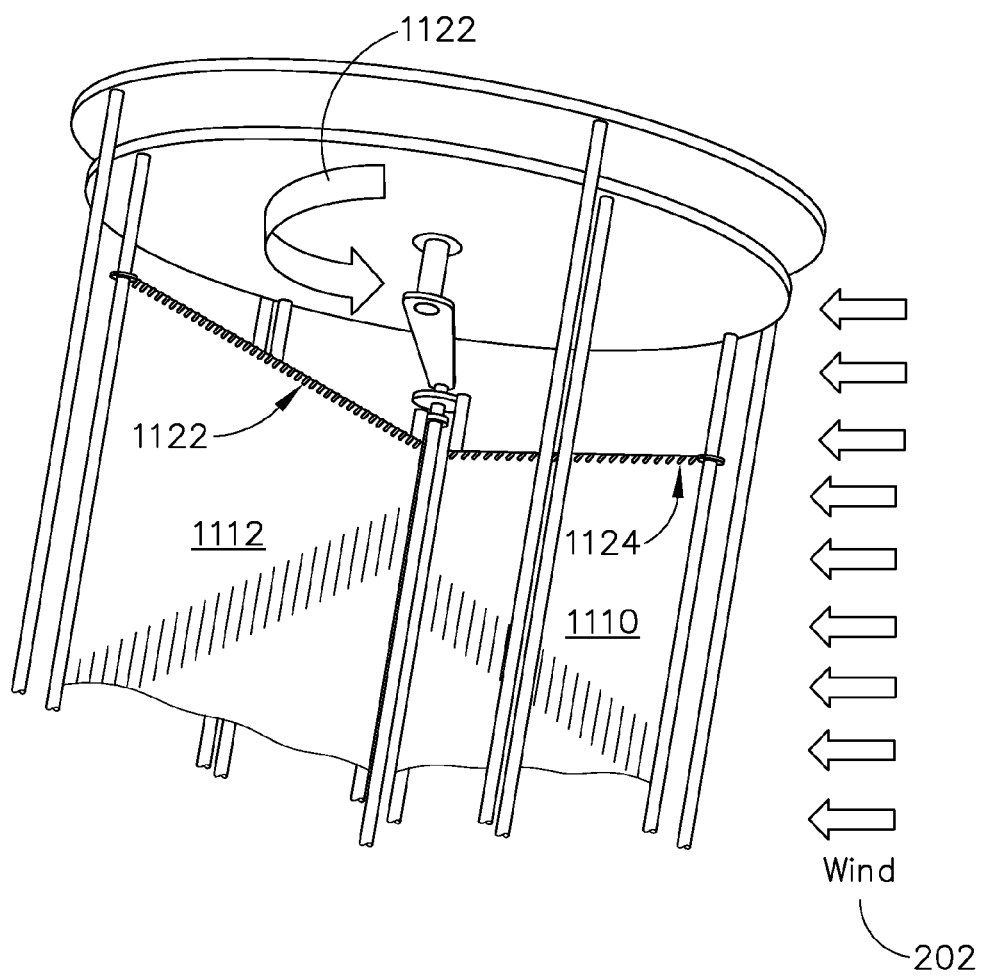

FIG. 11A shows the arrangement of sail in the disclosed wind turbine assembly (1100a). The assembly shows presence of two sails such as SAIL I (1110) and SAIL II (1112) however, the assembly may comprise of two sails, three sails or four sails. The sail is made up of a flexible material. Further, the sail is made extendible and/or shrinkable by mounting an extendable and/or shrinkable element (like an extendable and/or shrinkable wire, or elastic rope, or spring), or more than one element on the upper side of the sail (1102, 1104) and/or on the lower side of the sail (1106, 1108). Each sail is further connected from one side to a sail fixing washer (706, 710) and from other side to a sail swinging rod (905, 916). At any time one side of each sail is connected from one side to the sail swinging rod. FIG. 11B (1100b) shows the lower portion of the wind turbine assembly with the axis of rotation 1120 as well as the direction of wind 202. Similarly FIG. 11C (1100c) shows the upper portion of the wind turbine assembly with the axis of rotation 1122 and the direction of wind 202.

Thus, the fully assembled modified drag based wind turbine may comprise of a turbine supporting frame component as the fixed part of wind turbine followed by the turbine rotor as the moving part of the wind turbine followed by the sail supporting arm holding more than one sail through its sail swinging rods and sail rotational axis as the sail supporting part of the wind turbine.

The size and length of the sail is such that the rotation/movement of sail helps in reducing the negative torque and converting it into a positive torque thus is called a double effect wind turbine.

As the wind turbine is placed in an area with wind (high and/or low wind areas), the sail start to move under the action of wind drag. As such the sail will continuously extend and shrink during the movement. Owing to the flexibility of the sail swinging rods and the sail the turbine start gaining momentum and helps converting wind energy into useful mechanical energy that can be further used to drive an electrical generator or other ways of converting mechanical energy. The kinetic energy of the wind is captured by the sails present in the wind turbine assembly. During the operation, the turbine supporting frame, the sail rotational axis, and the sail supporting arms remain fixed while the turbine rotor assembly, sail swinging rods, the washers, and the sails move and/or rotate.

The amount of wind kinetic energy as captured by the modified drag based wind turbine may amount to more than the energy captured by the traditional drag based wind turbine without double-effect operation. Therefore, the disclosed wind turbine has a higher energy conversion efficiency. Further, the disclosed wind turbine has a simple and efficient design and thus can also start up under a low wind speed such as one approaching at 1 m/s and thus makes it an ideal choice for a number of places including the low wind places.

In addition, it will be appreciated that the various configuration and components may be able to scale the size according to the venue of use. Accordingly, the specification and drawings are to be regarded in an illustrative rather than a restrictive sense.

What is claimed is:

1. A process or double effect enhancement for a drag based turbine, wherein said turbine comprises:
   a turbine supporting frame;
   a turbine rotor;
   a sail supporting arm;
   a sail rotation axis rod;
   a sail swinging rod, wherein the sail rotation rod is connected to two sail swinging rods through a pair of bearings; and
   a turbine sail, wherein the wind turbine converts wind energy into mechanical energy;
   the process comprising reducing a negative torque by shrinking the width of a returning sail as said returning sail rotates about its rotation axis and increasing a positive torque wherein the positive torque is increased by extending the width of an advancing sail as said advancing sail rotates about its rotation axis.

2. A process of claim 1, wherein the double effect enhancement is obtained further by shifting the axis of rotation of a turbine sail.

3. The process of claim 2, wherein the turbine sail is shifted at a distance away from a rotor axis of rotation.

4. A modified wind turbine apparatus, comprising:
   a turbine supporting frame;

a turbine rotor;
a sail supporting arm;
a sail rotation axis rod;
a sail swinging rod, wherein the sail rotation axis rod is connected to two sail swinging rods through a pair of bearings; and
a turbine sail, wherein the wind turbine converts wind energy into mechanical energy.

5. The modified apparatus of claim 4, wherein the turbine rotor has improved efficiency of reducing a negative torque and increasing a positive torque.

6. The modified apparatus of claim 4, wherein the turbine supporting frame comprise of a top frame base and a bottom frame base connected by at least one supporting frame rod.

7. The modified apparatus of claim 6, wherein the turbine supporting frame further comprise of an inward shaft present in the center of the top frame base and bottom frame base.

8. The modified apparatus of claim 4, wherein the turbine rotor comprise of an upper rotor base and a lower rotor base connected by a rotor rod.

9. The modified apparatus of claim 8, wherein the turbine rotor further comprise of a bearing in the center of the upper rotor base and lower rotor base with an inner diameter equal to the diameter of the inward shaft.

10. The modified apparatus of claim 4, wherein the sail supporting arm comprise of an upper supporting arm and a lower supporting arm.

11. The modified apparatus of claim 4, wherein the sail supporting arms hold the sail rotation axis rod which is shifted a distance away from a rotor rotational axis.

12. The modified apparatus of claim 4, further comprise of more than one turbine sail connected from one end to a rotor rod and from other end to the sail swinging rod.

13. A modified drag based wind turbine apparatus, comprising:
a turbine supporting frame;
a turbine rotor;
a sail supporting arm;
a sail rotation axis rod;
a sail swinging rod, wherein the sail rotation axis rod is connected to two sail swinging rods through a pair of bearings; and
a turbine sail wherein the wind turbine converts wind energy into useful mechanical energy.

14. The modified drag based apparatus of claim 13, further comprise of more than one turbine sail.

15. The modified drag based apparatus of claim 14, wherein the width of turbine sail is larger than the radius of a rotor base.

16. The modified drag based apparatus of claim 13, wherein the turbine sail move in a cross direction to the direction of wind.

17. The modified drag based apparatus of claim 13, wherein the turbine sail is connected from one end to a rotor rod of turbine rotor and from other end to a sail swinging rod, wherein the modified drag based wind turbine apparatus may be used for wind power conversion, hydro-power conversion, blowers and fans.

* * * * *